(12) United States Patent
McMullen et al.

(10) Patent No.: US 9,020,531 B1
(45) Date of Patent: Apr. 28, 2015

(54) METHOD AND SYSTEM FOR DETERMINING CELL-SECTOR LOCATION PARAMETERS BASED ON NEIGHBOR STATUS

(75) Inventors: Michael P. McMullen, Leawood, KS (US); Rodney D. Nelson, Overland Park, KS (US); Benjamin Wilson, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 410 days.

(21) Appl. No.: 13/479,808

(22) Filed: May 24, 2012

(51) Int. Cl.
    *H04W 64/00* (2009.01)

(52) U.S. Cl.
    CPC .................................. *H04W 64/003* (2013.01)

(58) Field of Classification Search
    None
    See application file for complete search history.

(56) References Cited

U.S. PATENT DOCUMENTS

| | | | |
|---|---|---|---|
| 6,433,735 | B1 | 8/2002 | Bloebaum et al. |
| 6,442,393 | B1 | 8/2002 | Hogan |
| 6,865,395 | B2 * | 3/2005 | Riley .......................... 455/456.1 |
| 7,974,642 | B2 | 7/2011 | Lin et al. |
| 8,073,456 | B2 | 12/2011 | Tidestav |
| 8,121,621 | B2 | 2/2012 | Hoshino et al. |
| 2009/0023477 | A1 * | 1/2009 | Staudte ....................... 455/562.1 |
| 2010/0093377 | A1 | 4/2010 | Riley et al. |
| 2011/0034178 | A1 | 2/2011 | Mehta |

OTHER PUBLICATIONS

Emiliano Trevisani and Andrea Vitaletti, "Cell-ID location technique, limits and benefits: an experimental study," Proceedings of the Sixth IEEE Workshop on Mobile Computing Systems and Applications, 2004.

Jonas Willaredt, "WiFi and Cell-ID based positioning-Protocols, Standards and Solutions," Technische Universitat Berlin, Jan. 26, 2011.

* cited by examiner

*Primary Examiner* — German J Viana Di Prisco (57) ABSTRACT

Location information may be provided for a mobile station based on the serving area that is currently serving the mobile station. The location information may include a representative location (e.g., a centroid location of the serving area) and an uncertainty (e.g., a distance between the representative location and a boundary of the serving area). The representative location and uncertainty for a serving area may depend on the status of at least one neighboring area. For example, the effective size of a serving area may become larger when a neighboring area is heavily loaded or out of service. In an embodiment, a location server receives a request to locate a mobile station, selects a representative location and uncertainty for the serving area that is serving the mobile station based on the status of at least one neighboring area, and reports the representative location and uncertainty in response to the request.

18 Claims, 5 Drawing Sheets

METHOD AND SYSTEM FOR DETERMINING CELL-SECTOR LOCATION PARAMETERS BASED ON NEIGHBOR STATUS

BACKGROUND

Wireless devices, such as cellular telephones, are increasingly using location-based services. In a typical example, an application running on a wireless device could obtain an estimated location of the wireless device and then use that estimated location to provide some type of service to the user of the wireless device, such as showing the estimated location on a map, providing directions, or identifying nearby restaurants or other businesses.

The estimated location could be obtained using any number of location-determination techniques. In one possible approach, the wireless device may receive wireless signals from multiple satellite-based transmitters. The Global Positioning System (GPS) is an example of this approach. In another possible approach, the wireless device may receive wireless signals from multiple terrestrial-based transmitters. Advanced forward link trilateration (AFLT) is an example of this approach. In yet another possible approach, the estimated location of the wireless device may be determined based on the cell or the cell-sector that is currently serving the wireless device. For example, a centroid that was previously calculated for the cell-sector may be given as the estimated location of the wireless devices.

The estimated locations that are obtained in such approaches can have differing levels of uncertainty. Thus, an application that obtains an estimated location of a wireless device may also obtain an estimate of the uncertainty associated with the estimated location. In the case of estimated locations that are obtained using wireless signals from satellite-based transmitters or terrestrial-based transmitters, the uncertainty may depend on the characteristics of the wireless signals themselves and/or on the number of transmitters that are used. In the case of an estimated location that is obtained based on the cell-sector that is currently serving the wireless device, the uncertainty is often estimated based on calculated boundaries of the cell-sector.

Overview

In a first principal aspect, an exemplary embodiment provides a method. A request to locate a mobile station is received from a requestor. A serving area of a wireless network that is serving the mobile station is determined. The serving area is a wireless coverage area defined by a serving base station. At least one neighboring area in the wireless network is determined. A status of the at least neighboring area is determined. A representative location and uncertainty are selected based, at least in part, on the serving area and the status of the at least one neighboring area. The representative location and uncertainty are reported to the requestor in response to the request.

In a second principal aspect, an exemplary embodiment provides a system. The system comprises a processor, data storage, and program instructions stored in the data storage. The program instructions are executable by the processor to cause the system to perform functions, comprising: (a) receiving a request to locate a mobile station; (b) determining that the mobile station is served by a serving area of a wireless network, wherein the serving area is a wireless coverage area defined by a serving base station; (c) identifying at least one neighboring area in the wireless network; (d) determining a status of the at least one neighboring area; (e) selecting a representative location and an uncertainty based, at least in part, on the serving area and the status of at least one neighboring area; and (f) reporting the representative location and uncertainty in response to the request.

DETAILED DESCRIPTION OF EXEMPLARY EMBODIMENTS

1. Introduction

The inventors have recognized that conventional approaches for estimating a location and uncertainty for a mobile station based on the cell or cell-sector serving the mobile station can lead to inaccurate results because of changes in network status. For example, if the cell-sector that is closest to a mobile station is heavily loaded or is out of service, then the mobile station may be served by a neighboring cell-sector instead. In that case, estimating the mobile station's location and location uncertainty based on the boundaries calculated for the neighboring cell-sector may be inaccurate because the mobile station may be located outside of those boundaries. To address this problem, the inventors propose taking into account the status of at least one neighboring area when determining a representative location and uncertainty based on the serving area currently serving the mobile station being located.

The serving area could be a wireless coverage area, such as a cell-sector. The at least one neighboring area could be, for example, any cell-sector or other wireless coverage area that is sufficiently proximal to the serving area such that a mobile station located in that wireless coverage area could instead be served by the serving area. The status of the at least one neighboring area could include, for example, an indication of whether the at least one neighboring area is in service or out of service and/or an indication of a load level of the at least one neighboring area.

The representative location and uncertainty associated with a serving area could be selected based on an estimated geographic extent of the serving area, which, in turn, can depend on the status of at least one neighboring area. For example, if a neighboring area is in service and is not heavily loaded (circumstances that could be indicated by a "default" status), then the geographic extent of the serving area could be determined one way. However, if the neighboring area is out of service or is heavily loaded, then the geographic extent of the serving area could be determined in a different way. For example, the geographic extent of the serving area could be expanded to include geographic areas that would otherwise be served by the neighboring area.

Once the geographic extent of the serving area has been estimated, the representative location and uncertainty can be determined. For example, the representative location could be a centroid location in the estimated geographic extent, and the uncertainty could be the maximum distance from the centroid location to a boundary of the estimated geographic extent.

The representative location and uncertainty may then be used to provide location information in response to a request to locate a mobile station. For example, a location server may receive a request to locate a mobile station from a requestor. The requestor could be an application running on the mobile station or an external application. In response, the location server may determine that the mobile station is being served by a particular serving area and may determine the status of at least one neighboring area. The location server may then select a representative location and an uncertainty based on the serving area and the status of the at least one neighboring area and report the representative location and uncertainty to the requestor in response to the request.

In this way, the location information that is provided for a mobile station based on its serving area can, at least partially, take into account network status information (i.e., the status of at least one neighboring area) that can change the effective size of the serving area.

2. Exemplary Wireless Telecommunications Network

Figure 1:
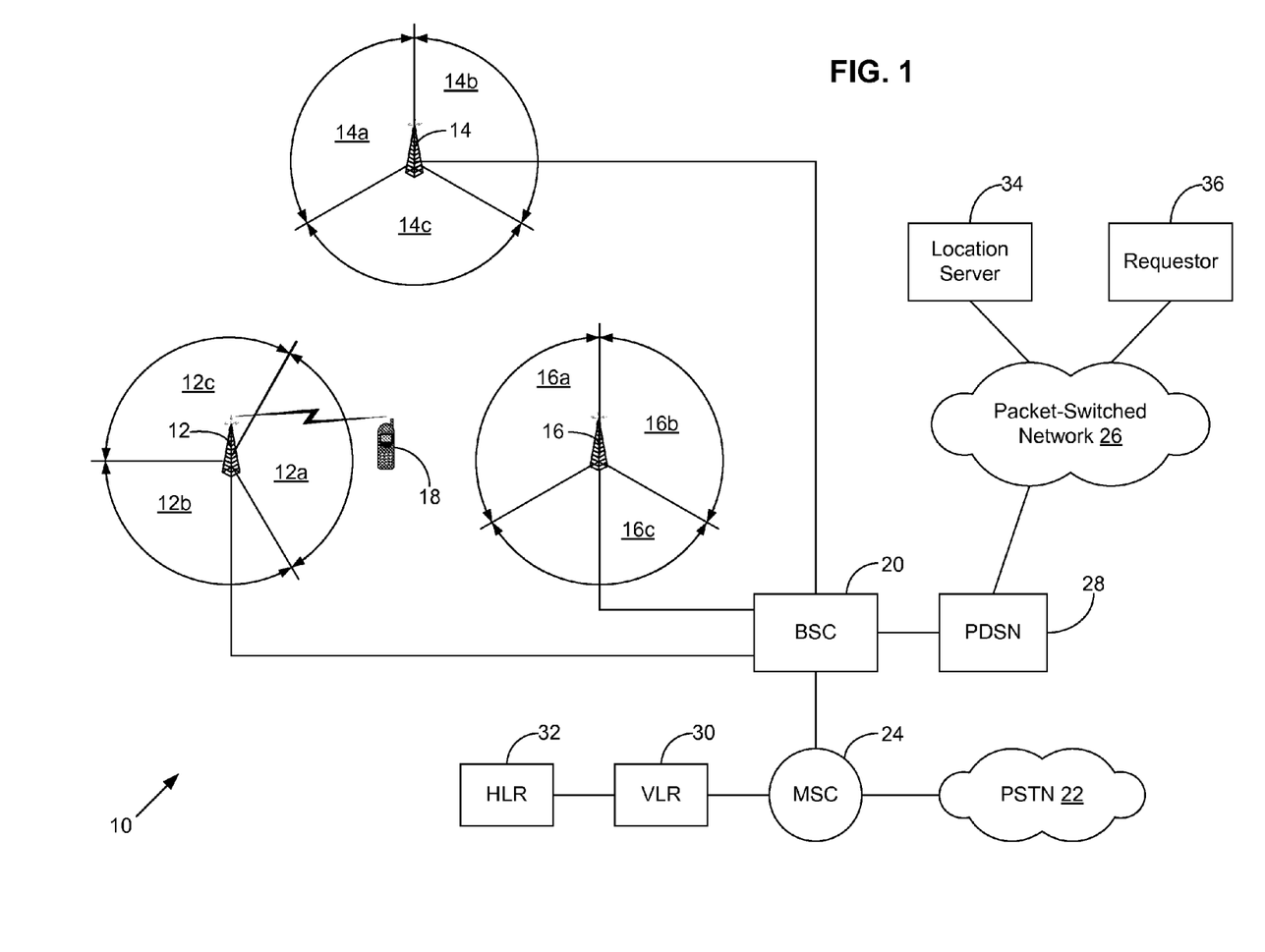
FIG. 1 is a block diagram of a wireless telecommunications network, in accordance with an exemplary embodiment.

FIG. 1 is a block diagram of a wireless telecommunications network 10 in which exemplary embodiments may be employed. Wireless telecommunications network 10 includes a plurality base transceiver stations (BTSs), exemplified in FIG. 1 by BTS 12, BTS 14, and BTS 16, that can wirelessly communicate with mobile stations, such as mobile station 18. Mobile station 18 could be, for example, a wireless telephone, a wirelessly-equipped computer (such as a handheld, laptop, or tablet computer), or other wireless communication device.

Each BTS could provide wireless coverage in an area, such as a cell, or in multiple wireless coverage areas, such as cell-sectors. As shown in FIG. 1, the wireless coverage provided by each of BTSs 12, 14, and 16 is directionally divided into three cell-sectors. Thus, BTS 12 provides cell-sectors 12a, 12b, and 12c, BTS 14 provides cell-sectors 14a, 14b, and 14c, and BTS 16 provides cell-sectors 16a, 16b, and 16c. The geographic extent of a given cell-sector can depend on a number of factors, such as the configuration of the antennas at the BTS, the transmission power levels, the terrain (including the locations building or other obstructions), the locations of neighboring cell-sections, and the relative utilization levels of the neighboring cell-sectors as compared to the given cell-sector. Some of these factors, such as relative utilization levels, can change over time. For instance, at one time, mobile station 18 could be served by cell-sector 12a when located as shown in FIG. 1. However, at another time, while at that same location, mobile station 18 might be served by cell-sector 14c or by cell-sector 16a, for example, because cell-sector 12a is more heavily loaded. Of course, the cell-sector serving mobile station 18 can also change as a result of mobile station 18 moving. For example, if mobile station 18 is served by cell-sector 12a as shown in FIG. 1 but then moves to a different location, mobile station 18 could then be served by cell-sector 14c (e.g., if it moves closer to BTS 14) or by cell-sector 16a (e.g., if it moves closer to BTS 16).

When mobile station 18 is being served by a given cell-sector, mobile station 18 may be able to transmit and receive wireless communications in accordance with a wireless communications protocol, for example, such as 1xRTT CDMA, EVDO, GSM, WiMAX (IEEE 802.16), WiFi (IEEE 802.11), UMTS, or LTE. This wireless communication could involve mobile station 18 exchanging voice, text, video, data, or other media, with one or more endpoints. In this regard, BTSs 12, 14, and 16 may be controlled by a base station controller (BSC) 20, which in turn may support communications with endpoints via one or more networks. In the example shown in FIG. 1, BSC 20 is communicatively coupled to a public switched telephone network (PSTN) 22 via a mobile switching center (MSC) 24 and to a packet-switched network 26 via a packet data serving node (PDSN) 28. It is to be understood, however, that this arrangement is exemplary only. For example, BSC 20 might support communications with PSTN 22 but not with packet network 26, might support communications with packet network 26 but PSTN 22, or might support communications with one or more other types of networks.

Mobile station 18 may communicate with other mobile stations and/or with landline stations via MSC 24 and PSTN 22. In this regard, MSC 24 may serve a plurality of BTSs (including BTSs 12, 14, and 16) via BSC 20 and may also serve another plurality of BTSs via one or more other BSCs. Wireless telecommunications network 10 may also include one or more additional MSCs that serve other BTSs in other areas.

To keep track of where mobile stations, such as mobile station 18 are operating, wireless telecommunications network 10 may include a visitor location register (VLR) 30 and a home location register (HLR) 32, as shown in FIG. 1. VLR 30 may keep track of mobile stations that are currently being served by MSC 24, and HLR 32 may keep track of all mobile stations that subscribe to wireless telecommunications network 10. VLR 30 and HLR 32 may obtain information regarding the locations of mobile stations through registration messages that the mobile stations transmit at various times. For example, a mobile station might transmit a registration message that identifies its current cell-sector when the mobile station first powers-up, at regular time intervals thereafter (e.g., every 10 minutes), and in response to other triggers (such as moving a certain distance or moving into a different paging zone). These registration messages could be received by VLR 30 and HLR 32. In this way, VLR 30 and HLR 32 may maintain location for each mobile station in its service area (which could be, for VLR 30, the area served by MSC 24 and, for HLR 32, all areas served by wireless telecommunications network 10). The location information for a mobile station could include an identification of the cell-sector that the mobile station reported in its most recent registration message and the date/time of the most recent registration message. HLR 32 and/or VLR 30 could also maintain other types of location information for mobile stations.

Packet-switched network 26 may include one or more private packet data networks and/or one or more public packet data networks (such as the Internet). Mobile stations, such as mobile station 18, may communicate with endpoints, such as other mobile stations, landline stations, email servers, Web servers, gaming server, and media servers, via packet-switched network 26. Some of those communications could involve location-based services, in which a mobile station or an external application may obtain or provide information based on the mobile station's location. In such cases, the mobile station's location could be provided by a location server 34, which could be connected packet-switched network 26. In particular, location server 34 may receive a request to locate a mobile station, such as mobile station 18, and may provide an estimated location of the mobile station (e.g., in terms of latitude and longitude) in response to the request. Location server 34 may also provide an uncertainty associated with the estimated location.

The request to locate the mobile station could originate from the mobile station itself, or the request could originate from an external application, exemplified in FIG. 1 by requestor 36. In some cases, the location of the mobile station could be determined using the cell-sector that is currently-serving the mobile station. For example, if the mobile station originates a request to determine its location, the mobile station may include in the request an identification of the cell-sector that is currently serving it. If requestor 36 originates the request to locate the mobile station, then location server 34 could determine the cell-sector currently serving the mobile station (according to the mobile station's last registration message) by querying VLR 30 or HLR 32.

Figure 2:
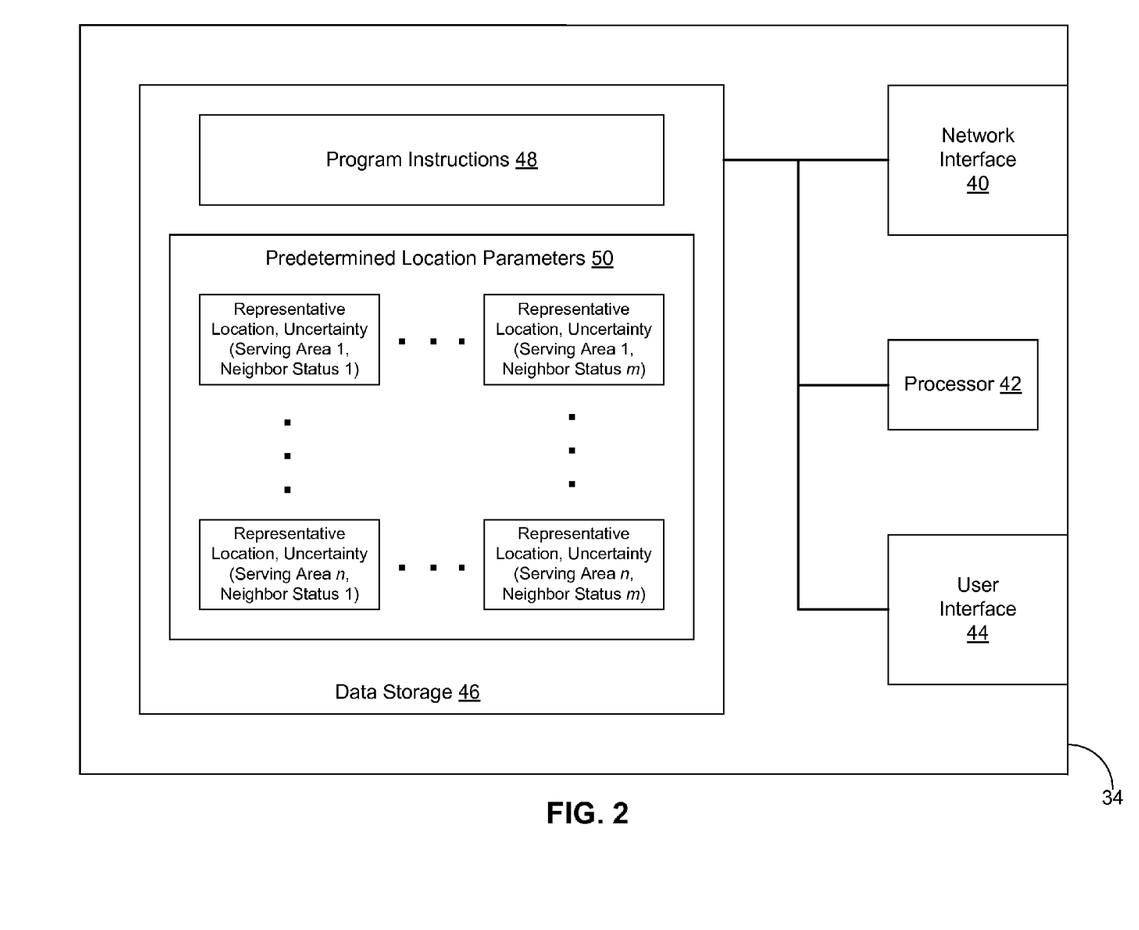
FIG. 2 is a block diagram of a location server, in accordance with an exemplary embodiment.

Once location server 34 has determined the cell-sector currently serving the mobile station, location server 34 may determine a representative location and uncertainty for that cell-sector based on the status of at least one neighboring cell-sector. In this regard, FIG. 2 illustrates an exemplary configuration for location server 34. As shown in FIG. 2, location server 34 may include a network interface 40 through which location server 34 can receive requests to locate mobile stations and provide responses. For example, location server 34 could be communicatively coupled to packet-switched network 26 via network interface 40. Location server 34 may also be able to query one or more elements of wireless telecommunications network 10, such as BSC 20, VLR 30, and/or HLR 32, via network interface 40.

As shown in FIG. 2, location server 34 also includes a processor 42, a user interface 44, and data storage 46. User interface 44 could include one or more displays and/or other output devices for outputting text, graphics, or other information to a user. User interface 44 could also include one or more input devices, such as a keyboard, for receiving input from a user. Such input could be used, for example, to control the functioning of location server 34.

Data storage 46 may include read only memory (ROM), random access memory (RAM), flash memory, one or more magnetically-encoded disks, one or more optically-encoded disks, or any other type of non-transitory computer readable medium. Data storage 46 may store, for example, program instructions 48 and predetermined location parameters 50. Predetermined location parameters 50 can include representative locations and uncertainties that have been previously determined for a given serving area for each of m status indications for at least one neighboring area. The m status indications could include, for example, a default status, a loaded status, and an out-of-service status for a particular neighboring area. The m status indications could also include combined status indications for multiple neighboring areas. As shown, predetermined location parameters 50 include representative locations and uncertainties that have been previously calculated for n serving areas. With reference to FIG. 1, the n serving areas could include, for example, cell-sectors 12a, 12b, 12c, 14a, 14b, 14c, 16a, 16b, and 16c.

Program instructions 48 may include instructions that can be executed by processor 42 to cause location server 34 to perform any of the functions described herein. Thus, program instructions 48 may be executable by processor 42 to calculate one or more of the location parameters included in predetermined location parameters 50 (e.g., as described below for FIGS. 3 and 4) and/or to provide a representative location and uncertainty based on predetermined location parameters 50 in response to a request to locate a mobile station (e.g., as described below for FIG. 5).

Although FIG. 2 illustrates an example in which geographic parameters 50 are stored in location server 34, it is to be understood that some or all of geographic parameters 50 could be stored in other network elements that are accessible by location server 34. In addition, while location server 34 has been described above as being connected to packet-switched network 26, it is to be understood that location server 34 could be otherwise located in wireless telecommunications network 10.

3. Exemplary Method for Determining Location Parameters

Figure 3:
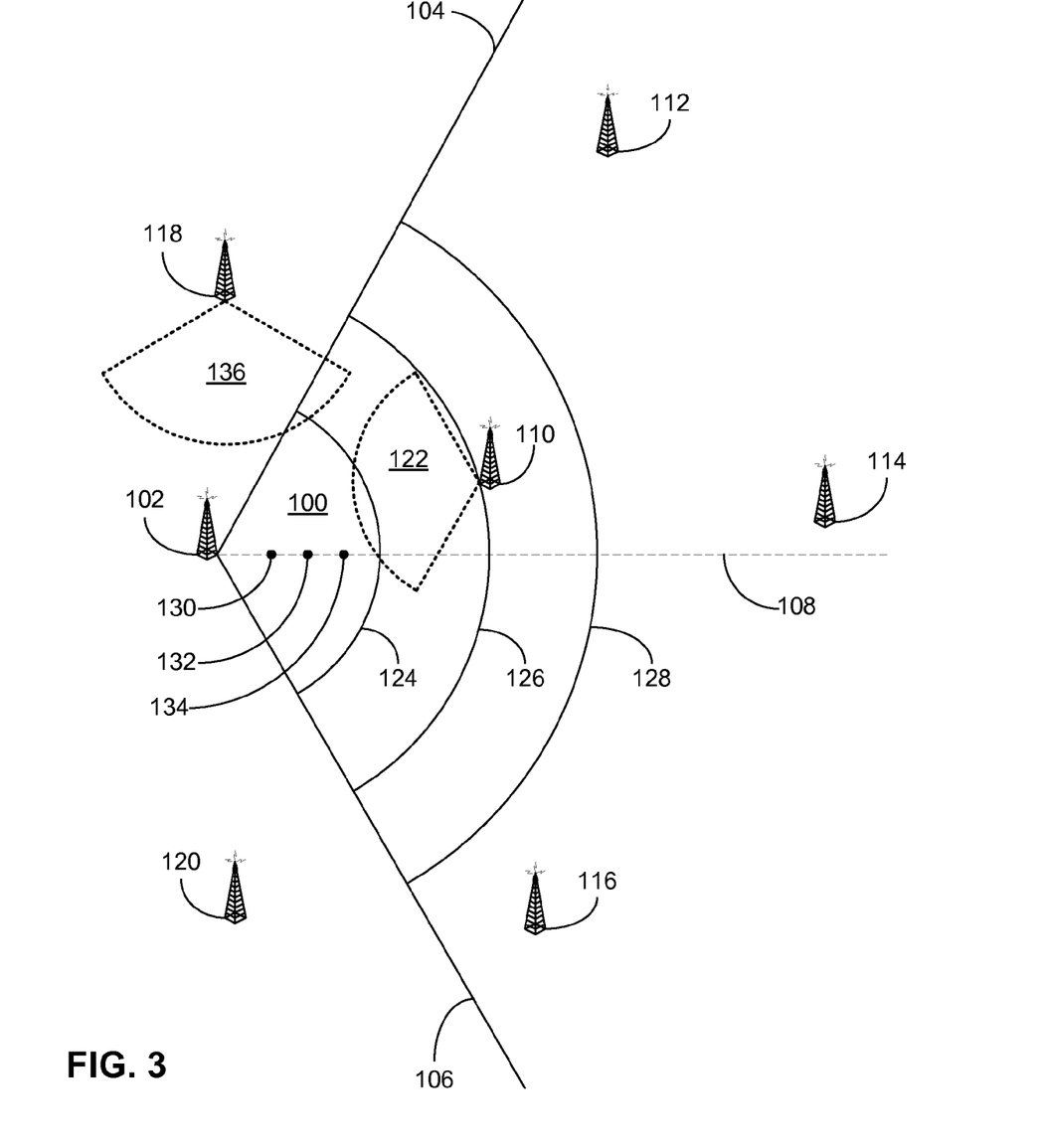
FIG. 3 illustrates a scenario for determining a representative location and uncertainty for a serving area based on a status of at least one neighboring area, in accordance with an exemplary embodiment.

FIG. 3 illustrates an example arrangement of base stations to illustrate how location parameters for a serving area 100 may be determined based on the status of at least one neighboring area. In this example, serving area 100 is a wireless coverage area defined by a serving base station 102. More particularly, serving area 100 is a cell-sector having a 120° azimuthal range, as indicated by lines 104 and 106. Also shown is a center-line 108 that bisects the azimuthal range indicated by lines 104 and 106. Although serving are 100 is the only cell-sector shown for serving base station 102, it is to be understood that serving base station 102 may define three of such 120° cell-sectors.

FIG. 3 also shows a number of base stations in the vicinity of serving base station 102. Four of the base stations, base stations 110, 112, 114, and 116, are within the azimuthal range of serving area 100 indicated by lines 104 and 106. Two of the base stations, base stations 118 and 120, are outside of the azimuthal range of serving area 100. Among the base stations within the azimuthal range of serving area 100, base station 110 is nearest to serving base station 102. This nearest base station 110 may define one or more wireless coverage areas, such as three 120° cell-sectors. As shown, one of the wireless coverage areas defined by nearest base station 110 is a cell-sector 122, indicated by dotted lines, that is generally directed toward serving base station 102. In this example, cell-sector 122 is identified as a neighboring area to serving area 100 and, thus, will be referred to as neighboring area 122.

The geographic extent of serving area 100 may be estimated based on the status of neighboring area 122. The status of neighboring area 122 could be one of a default status, a loaded status, and an out-of-service status. The default status may be applicable when neighboring area 122 is functioning normally. The loaded status may be applicable when neighboring area 122 is sufficiently loaded that a mobile station operating within neighboring area 122 might be served by another wireless coverage area, such as serving area 100. The out-of-service status may be applicable when nearest base station 110 has been taken out of service or is otherwise not operational.

To account for the status of neighboring area 122, the geographic extent of serving area 100 may be modeled as a sector of a circle centered at serving base station 102 and having a radius that is dependent on the status of neighboring area 122. If neighboring area 122 has the default status, then the radius may be selected as a fraction (e.g., 60%) of the separation distance between serving base station 102 and nearest base station 110. The radius selected for the default status of neighboring area 122 may result in the geographic extent of serving area 100 being modeled as a sector having an arc 124, as shown in FIG. 3. Thus, when neighboring area 122 has the default status, the geographic extent of serving area 100 may be estimated as the area bounded by lines 104 and 106 and by arc 124.

If neighboring area 122 has the loaded status, then the radius may be greater. For example, the radius may be selected to be approximately equal to the separation distance between serving base station 102 and nearest base station 110 when neighboring area 122 has the loaded status. The radius selected for the loaded status of neighboring area 122 may result in the geographic extent of serving area 100 being modeled as a sector having an arc 126, as shown in FIG. 3. Thus, when neighboring area 122 has the loaded status, the geographic extent of serving area 100 may be estimated as the area bounded by lines 104 and 106 and by arc 126.

The radius may be greater still if neighboring area 122 has the out-of-service status. In that case, the radius may be selected based on the separation distance between base station 102 and the next-nearest base station within the azimuthal range indicated by 104 and 106. The next-nearest base station could be, for example, base station 116. Alternatively, the radius could be selected based on a maximum range of serving base station 102. The maximum range could be calculated based on the terrain, or it could be approximated as a fixed value (e.g., 25,000 meters). The radius selected for the out-of-service status of neighboring area 122 may result in the geographic extent of serving area 100 being modeled as a sector having an arc 128, as shown in FIG. 3. Thus, when neighboring area 122 has the out-of-service status, the geographic extent of serving area 100 may be estimated as the area bounded by lines 104 and 106 and by arc 128.

Location parameters for serving area 100, including a representative location and an uncertainty, may be determined based on the estimated geographic extent of serving area 100, which, in turn, is dependent on the status of neighboring area 122. The representative location could, for example, be based on a centroid location. With the geographic extent of serving area 100 modeled as a sector, the centroid location could be a point on center-line 108 at a distance from serving base station 102 that corresponds to a fraction (e.g., 30%) of the radius of the sector. Thus, if serving area 100 is modeled as a sector having arc 124 (neighboring area 122 has the default status) the representative location could be selected as centroid location 130, if serving area 100 is modeled as a sector having arc 126 (neighboring area 122 has the loaded status) the representative location could be selected as centroid location 132, and if serving area 100 is modeled as a sector having arc 128 (neighboring area 122 has the out-of-service status) the representative location could be selected as centroid location 134.

The uncertainty associated with a representative location for serving area 100 may be determined as the maximum distance between the representative location and an estimated boundary of serving area 100. Thus, if neighboring area 122 has the default status the uncertainty could be the maximum distance between centroid location 130 and the boundary defined by lines 104 and 106 and arc 124. If neighboring area 122 has the loaded status the uncertainty could be the maximum distance between centroid location 132 and the boundary defined by lines 104 and 106 and arc 126. If neighboring area 122 has the out-of-service status the uncertainty could be the maximum distance between centroid location 134 and the boundary defined by lines 104 and 106 and arc 128.

As illustrated in FIG. 3, the effective size of serving area 100 may be smallest when neighboring area 122 has the default status. The effective size of serving area 100 may become greater when neighboring area 122 has the loaded status, and even greater when neighboring area 122 has the out-of-service status. As well, the representative location for serving area 100 may be closest to serving base station 102 when neighboring area 122 has the default status. The representative location may be farther from serving base station 102 when neighboring area 122 has the loaded status, and may be even farther when neighboring area 122 has the out-of-service status. It follows that the uncertainty associated with the representative location may be smallest when neighboring area 122 has the default status. The uncertainty may be greater when neighboring area 122 has the loaded status, and even greater when neighboring area 122 has the out-of-service status.

Figure 4:
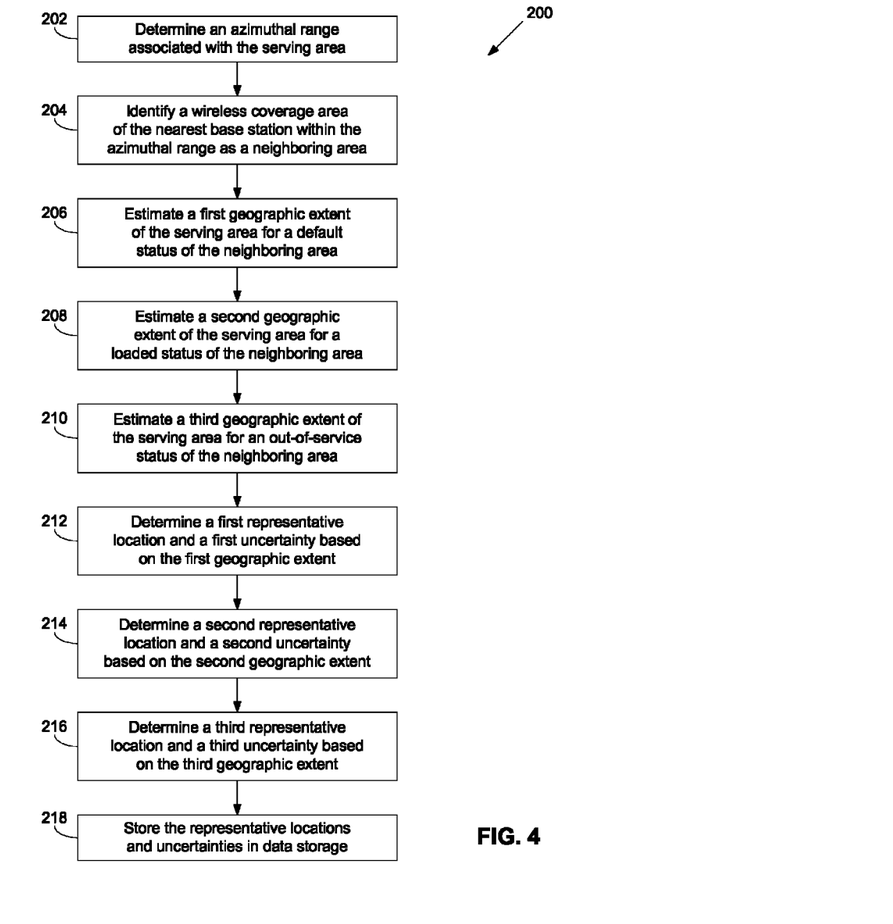
FIG. 4 is a flowchart of a method for determining a representative location and uncertainty for a serving area based on a status of at least one neighboring area, in accordance with an exemplary embodiment.

The determinations of representative locations and uncertainties for a serving area, such as serving area 100, could be made in advance of a request to provide location information or in response to a request to provide location information. FIG. 4 illustrates a method 200 for determining in advance representative locations and uncertainties for a serving area. For purposes of illustration, method 200 is described with reference to serving area 100 shown in FIG. 3. It is to be understood, however, that method 200 is applicable to other configurations.

Method 200 begins with determining an azimuthal range associated with the serving area, as indicated by block 202. The azimuthal range may be defined by the antenna or antennas that the serving base station uses to define the serving area. For example, the serving base station may use directional antennas to define three cell-sectors, each having an azimuthal range of 120 degrees. With reference to FIG. 3, serving area 100 is a cell-sector of serving base station 102 with an azimuthal range of 120 degrees, as indicated by lines 104 and 106.

To identify a neighboring area, method 200 determines which of the base stations that are within the serving area's azimuthal range is nearest to the serving base station. A wireless coverage area of the nearest base station within the azimuthal range may then be identified as the neighboring area, as indicated by block 204. In the example discussed above for FIG. 3, a cell-sector of base station 110 is selected as neighboring area 122 for serving area 100.

A first geographic extent of the serving area may be estimated for a default status of the neighboring area, as indicated by block 206. A second geographic extent of the serving area may be estimated for a loaded status of the neighboring area, as indicated by 208. A third geographic extent of the serving area may be estimated for an out-of-service status of the neighboring area, as indicated by block 210. The geographic extents could be estimated in the manner described above for serving area 100 in FIG. 3.

A representative location and uncertainty for each status of the neighboring area could then be determined based on the estimated geographic extent corresponding to that status. Thus, a first representative location and a first uncertainty may be determined based on the first geographic extent (block 212), a second representative location and a second uncertainty may be determined based on the second geographic extent (block 214), and a third representative location and a third uncertainty may be determined based on the third geographic extent (block 216). The representative locations and uncertainties could be determined based on the geographic extents in the manner described above for FIG. 3.

The representative locations and uncertainties may then be stored in data storage, such as data storage 46 in location server 34. In this way, location parameters for a serving area may be determined in advance for each possible status of a neighboring area. Although FIG. 4 describes the determination of location parameters for a default status, loaded status, and out-of-service status of the neighboring area, it is to be understood that other types of status could also be defined. For instance, instead of the load level of the neighboring area being evaluated as either a default status or a loaded status, multiple loading levels could be defined. Thus, in addition to a default status and an out-of-service status, the neighboring area could have a moderately loaded status, a heavily loaded status, and a fully loaded status. Other status types could be defined for the neighboring area, as well. A representative location and uncertainty may be determined for the serving area for each status type that is defined for the neighboring area.

In addition, although FIG. 4 describes the determination of location parameters for a serving area based on the status of one neighboring area, it is to be understood that multiple neighboring areas could be considered. For example, with reference to FIG. 3, in addition to cell-sector 122, one or more other cell-sectors defined by base station 110 could be identified as neighboring areas. And, in addition to base station 110, which is the nearest base station to base station 102 that is within the azimuthal range of serving area 100, wireless coverage areas of one or more other base stations may be identified as neighboring areas. For example, a cell-sector of base station 116, the next-nearest base station within the azimuthal range of serving area 100, could be identified as a neighboring area. It is also possible that a wireless coverage area provided by a base station that is not within the serving area's azimuthal range could be identified as a neighboring area. For example, a cell-sector 136 of base station 118 might be identified as a neighboring area.

In the case that multiple neighboring areas are identified for a serving area, the status of any of the neighboring areas that is not a default status might affect the geographic extent that is estimated for the serving area. Thus, if cell-sectors 122 and 136 are both identified as neighboring areas of serving area 100, then the geographic extent that is estimated for serving area 100 could be increased if either cell-sector 122 or cell-sector 136 has a loaded status or out-of-service status.

4. Exemplary Method for Providing Location Information

Figure 5:
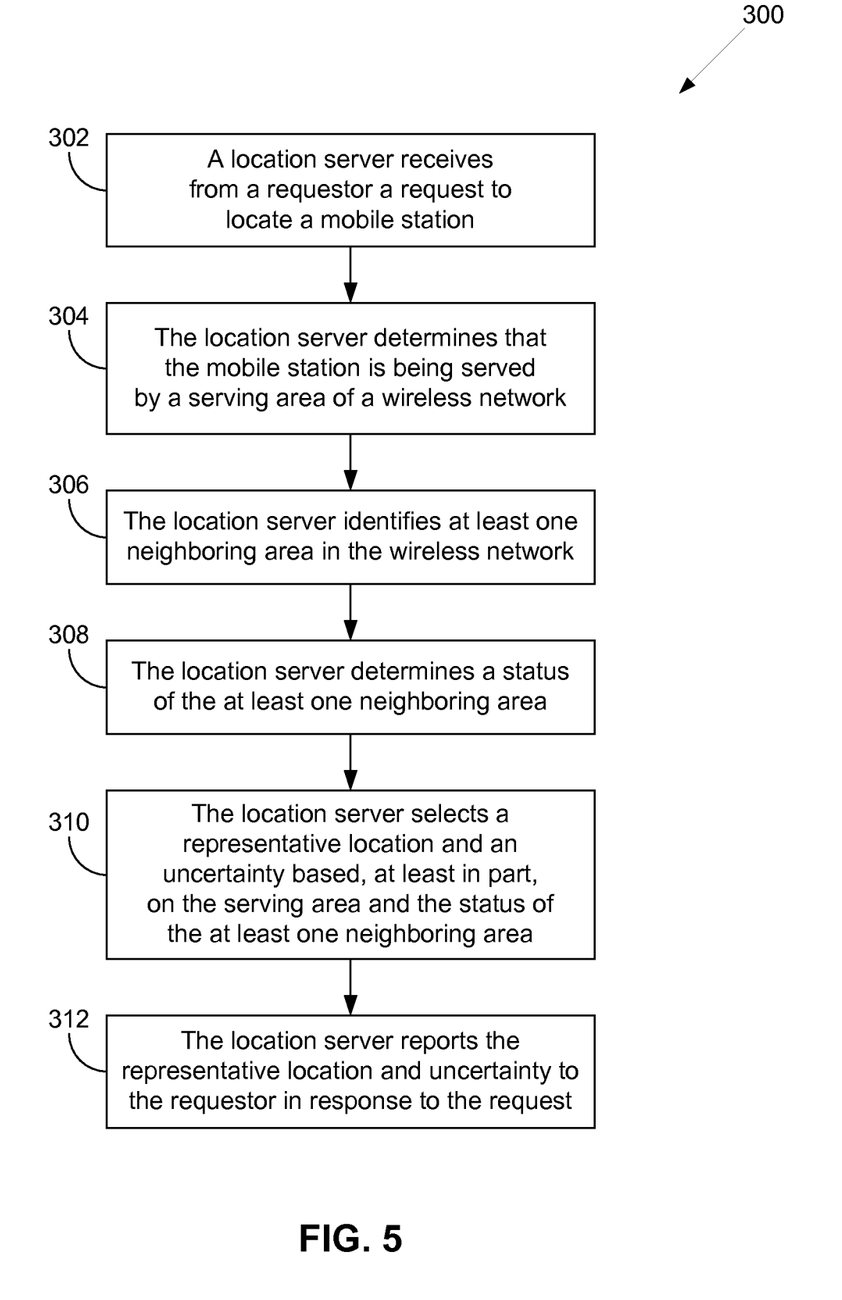
FIG. 5 is flowchart of a method for providing location information to a requestor, in accordance with an exemplary embodiment.

FIG. 5 is a flowchart illustrating an exemplary method 300 for providing location information. For purposes of illustration, method 300 is described with reference to the configuration of wireless telecommunications network 10 shown in FIG. 1 and the configuration of location server 34 shown in FIG. 2. It is to be understood, however, that other configurations and/or elements could be used.

Method 300 begins when a location server (e.g., location server 34) receives from a requestor a request to locate a mobile station (e.g., mobile station 18), as indicated by block 302. The requestor could correspond to an application that is running on the mobile station. For example, a user of mobile station 18 may invoke a mapping application or other application that provides information based on location. In response, mobile station 18 may query location server 34 to request its location. Alternatively, the requestor could correspond to an application that is external to the mobile station. For example, a user of mobile station 18 may access a Web site or other external application that is configured to provide content or information that is based on location. In response, the external application (e.g., requestor 36) may query location server 34 to request the location of mobile station 18.

In response to the request, the location server may determine that the mobile station is being served by a serving area of a wireless network, as indicated by block 304. The serving area could be a cell-sector or other type of wireless coverage area. To determine the serving area serving the mobile station, the location server may refer to information that is contained in the request that it received from the requestor in block 302. For example, the request could identify the serving area that is currently serving the mobile station. Alternatively, the location server could determine the serving area by querying a network element such as HLR 32 or VLR 30. For example, HLR 32 and/or VLR 30 may store an identification of the serving area serving the mobile station based on the mobile station's most recent registration message, or could page the mobile station to have the mobile station identify its current serving area. Other ways of determining the serving area serving the mobile station are also possible.

The location server may also identify at least one neighboring area in the wireless network, as indicated by block 306. The at least one neighboring area could be any wireless coverage area (e.g., a cell-sector) of the wireless network where the mobile station might be located while being served by the serving area. For example, the at least one neighboring area could be identified based on proximity to the serving area, propagation characteristics of the serving area, and/or other criteria. In one approach, the at least one neighboring area could include a wireless coverage area provided by the closest base station that is within an azimuthal range of the serving area, as described above for FIG. 3. It is to be understood, however, that other procedures could be used to identify the at least one neighboring area possible.

Once the at least one neighboring area has been identified, the location server may determine a status of the at least one neighboring area, as indicated by block 308. Determining the status of the at least one neighboring area could involve determining whether the at least one neighboring area is in service or out of service and/or determining a load level of the at least one neighboring area. Thus, in one example, the status of the at least one neighboring area could be determined to be one of a default status, a loaded status, and an out-of service status, as described above for FIGS. 3 and 4. It is to be understood, however, that other status types could also be used.

To determine the status of the at least one neighboring area, the location server could query one or more network elements in the wireless network. For example, location server 34 could query BSC 20 or other element in wireless telecommunications network to determine the status of the at least one neighboring area.

The location server may select a representative location and an uncertainty based, at least in part, on the serving area and the status of the at least one neighboring coverage area, as indicated by block 310. In one approach, the representative location and uncertainty could be selected from parameters that have been previously determined for that serving area for that status of the at least one neighboring area. For example, location server 34 could select the representative location and uncertainty from predetermined location parameters 50 stored in data storage 46. Alternatively, the location server could determine the representative location and uncertainty for the mobile station (e.g., using the procedures described above for FIGS. 3 and 4) in response to receiving the request to locate the mobile station, rather than relying on previously determined location parameters.

Once the representative location and uncertainty have been selected, the location server may report the representative location and uncertainty to the requestor in response to the request, as indicated by block 312. The requestor may then use the representative location and at least one uncertainty parameter to provide information to a user of the mobile station. For example, if a mapping application on the mobile station is the requestor, then the mapping application may display the representative location on a map as the location of the mobile station. In addition, the mapping application may indicate an uncertainty in the mobile station's location based on the at least one uncertainty parameter. For example, the mapping application may show a circle, ellipse, or other shape around the mobile station's indicated location on the map. The dimensions of the circle, ellipse, or other shape used to indicate the uncertainty may be based on the uncertainty provided by the location server.

In this way, the location information that is provided to a requestor that requests the location of a mobile station may more accurately reflect the mobile station's location and uncertainty in the mobile station's location.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
   receiving from a requestor a request to locate a mobile station;
   determining that said mobile station is served by a serving area of a wireless network, wherein said serving area is a wireless coverage area defined by a serving base station;
   identifying at least one neighboring area in said wireless network;
   determining a status of said at least one neighboring area from among at least three different status types, the three different status types including a default status, a loaded status, and an out-of-service status;
   selecting a representative location and an uncertainty based, at least in part, on said serving area and said status of said at least one neighboring area, wherein said selecting comprises:
      in response to said at least one neighboring area having said default status, selecting a first representative location and a first uncertainty;
      in response to said at least one neighboring area having said loaded status, selecting a second representative location and a second uncertainty; and
      in response to said at least one neighboring area having said out-of-service status, selecting a third representative location and a third uncertainty; and
   reporting said representative location and uncertainty to said requestor in response to said request.

2. The method of claim 1, wherein said serving area and said at least one neighboring areas are cell-sectors.

3. The method of claim 1, wherein identifying at least one neighboring area in said wireless network comprises:
   determining that said serving area is associated with an azimuthal range defined by said serving base station;
   identifying at least one base station located within said azimuthal range; and
   identifying one or more wireless coverage areas defined by said at least one base station as said at least one neighboring area.

4. The method of claim 1, wherein determining a status of said at least one neighboring area comprises determining whether said at least one neighboring area is in service or out of service.

5. The method of claim 1, wherein determining a status of said at least one neighboring area comprises determining a load level of said at least one neighboring area.

6. The method of claim 1, wherein selecting a representative location and an uncertainty based, at least in part, on said serving area and said status of said at least one neighboring area comprises:
   estimating a geographic extent of said serving area based on said status of said at least one neighboring area;
   selecting said representative location based on said estimated geographic extent of said serving area; and
   selecting said uncertainty based on said estimated geographic extent of said serving area.

7. The method of claim 6, wherein selecting said representative location based on said estimated geographic extent of said serving area comprises:
   determining a centroid location in said estimated geographic extent of said serving area; and
   selecting said representative location based on said centroid location.

8. The method of claim 6, wherein selecting said uncertainty based on said estimated geographic extent of said serving area comprises:
   determining an estimated boundary defining said estimated geographic extent of said serving area;
   determining a maximum distance between said representative location and said estimated boundary; and
   selecting said uncertainty based on said maximum distance.

9. The method of claim 6, wherein estimating a geographic extent of said serving area based on said status of said at least one neighboring area comprises:
   selecting a radius based on said status of said at least one neighboring area; and
   estimating said geographic extent of said serving area as a sector of a circle centered at said serving base station, wherein said circle has said selected radius.

10. The method of claim 9, wherein said selected radius has (i) a first length when said at least one neighboring area has said default status, (ii) a second length when said at least one neighboring area has said loaded status, and (iii) a third length when said at least one neighboring area has said out-of-service status.

11. The method of claim 10, wherein said at least one neighboring area is defined by a neighboring base station, wherein said neighboring base station has a separation distance from said serving base station, and wherein said first length is less than said separation distance.

12. The method of claim 11, wherein said second length is approximately equal to said separation distance.

13. The method of claim 11, wherein said third length is greater than said separation distance.

14. A system comprising:
   a processor;
   data storage; and
   program instructions stored in said data storage, wherein said program instructions are executable by said processor to cause said system to perform functions, said functions comprising:
      receiving a request to locate a mobile station;
      determining that said mobile station is served by a serving area of a wireless network, wherein said serving area is a wireless coverage area defined by a serving base station;
      identifying at least one neighboring area in said wireless network;
      determining a status of said at least one neighboring area from among at least three different status types, the three different status types including a default status, a loaded status, and an out-of-service status;

selecting a representative location and an uncertainty based, at least in part, on said serving area and said status of said at least one neighboring area, wherein said selecting comprises:
- in response to said at least one neighboring area having said default status, selecting a first representative location and a first uncertainty;
- in response to said at least one neighboring area having said loaded status, selecting a second representative location and a second uncertainty; and
- in response to said at least one neighboring area having said out-of-service status, selecting a third representative location and a third uncertainty; and reporting said representative location and uncertainty to said requestor in response to said request.

15. The system of claim 14, wherein determining a status of said at least one neighboring area comprises querying at least one element of said wireless network.

16. The system of claim 15, wherein said at least one element of said wireless network comprises a base station controller (BSC).

17. The system of claim 14, wherein said second representative location has a greater distance from said serving base station than that of said first representative location, and wherein second uncertainty is greater than said first uncertainty.

18. The system of claim 17, wherein said third representative location has a greater distance from said serving base station than that of said second representative location, and wherein third uncertainty is greater than said second uncertainty.

* * * * *